United States Patent
Sasaki et al.

(10) Patent No.: US 6,224,130 B1
(45) Date of Patent: May 1, 2001

(54) MECHANISM FOR MOUNTING SEAT BELT OF CENTER SEATING SPACE OF A VEHICLE SEAT

(75) Inventors: Atsuki Sasaki, Nagoya; Naoaki Hoshihara, Aichi; Kenji Onodera, Toyota; Masamichi Sugihara, Kariya, all of (JP)

(73) Assignees: Takashimaya Nippatsu Kogyo Co., LTD, Toyota; Aisin Seiki Kabushiki Kaisha; Toyota Shatai Kabushiki Kaisha, both of Kariya, all of (JP)

( * ) Notice: Subject to any disclaimer, the term of this patent is extended or adjusted under 35 U.S.C. 154(b) by 0 days.

(21) Appl. No.: 09/288,658

(22) Filed: Apr. 9, 1999

(30) Foreign Application Priority Data

Jun. 30, 1998 (JP) .................................................. 10-183994

(51) Int. Cl.[7] ...................................................... B60N 2/02
(52) U.S. Cl. .................. 296/65.13; 296/68.1; 280/801.2; 297/473
(58) Field of Search .............................. 296/68.1, 65.13; 280/801.2; 297/473

(56) References Cited

U.S. PATENT DOCUMENTS

| | | | | |
|---|---|---|---|---|
| 4,262,963 | * | 4/1981 | Bauer et al. ........................ | 297/473 |
| 4,676,555 | * | 6/1987 | Tokugawa ........................... | 297/473 |
| 4,818,022 | * | 4/1989 | Nishimura .......................... | 297/473 |
| 4,824,175 | * | 4/1989 | Tokugawa ........................... | 297/473 |
| 5,031,961 | * | 7/1991 | Isern .................................... | 297/473 |
| 5,044,683 | * | 9/1991 | Parsson .............................. | 296/68.1 |
| 5,102,197 | * | 4/1992 | Itsuki ................................... | 297/473 |
| 5,226,697 | * | 7/1993 | Borlinghaus et al. ............. | 297/473 |
| 5,282,672 | * | 2/1994 | Borlinghaus ........................ | 297/473 |
| 5,294,184 | * | 3/1994 | Blake et al. ........................ | 296/68.1 |
| 5,322,348 | * | 6/1994 | Johnson et al. .................... | 297/473 |
| 5,487,583 | * | 1/1996 | Ikegaya et al. .................... | 296/65.13 |
| 5,924,772 | * | 7/1999 | Pleyer et al. ....................... | 297/473 |

FOREIGN PATENT DOCUMENTS

| | | | |
|---|---|---|---|
| 1 214 104 | | 4/1966 | (DE) . |
| 2803896 | * | 8/1979 | (DE) ................................... 297/473 |
| 2820589 | * | 11/1979 | (DE) ................................... 297/473 |
| 2826634 | * | 1/1980 | (DE) ................................... 297/473 |
| 36 31 791 A1 | | 4/1987 | (DE) . |
| 2183988 | * | 6/1987 | (GB) ................................... 297/473 |
| 0000441 | * | 1/1983 | (JP) ..................................... 297/473 |
| 0162136 | * | 6/1990 | (JP) ..................................... 297/473 |
| 2-143252 | | 12/1990 | (JP) . |
| 5-44720 | | 6/1993 | (JP) . |

* cited by examiner

Primary Examiner—Joseph D. Pape
Assistant Examiner—Kiran Patel
(74) Attorney, Agent, or Firm—Oliff & Berridge, PLC

(57) ABSTRACT

A mechanism for mounting a seat belt of a center seating space of a vehicle seat which exhibits sufficient strength and reduces weight and production costs to the greatest degree is provided. Such a mechanism is provided by separating a seat into a right seating section and a left seating section at the center thereof such that each of the separated seating sections is independently slidable back and forth by means of a seat sliding rail formed of a pair of lower rails fixed to a floor side and a pair of upper rails fixed to the bottom of a seat. A base member bent at an intermediate bent portion defined by a belt mount plate portion and a rail mount connector portion is attached to a side surface of the inner upper rail at the rail connector plate portion such that the belt mount plate portion extends outward. An anchor for the seat belt of the center seating space of the seat is fixed to the top end of the belt mount plate portion of the base member.

5 Claims, 4 Drawing Sheets

MECHANISM FOR MOUNTING SEAT BELT OF CENTER SEATING SPACE OF A VEHICLE SEAT

INCORPORATION BY REFERENCE

The disclosure of Japanese Patent Application No. HEI 10-183994 filed on Jun. 30, 1998 including the specification, drawings and abstract is incorporated herein by reference in its entirety.

BACKGROUND OF THE INVENTION

1. Field of the Invention

The present invention relates to a mechanism for mounting a seat belt of a center seating space of a vehicle seat, which exhibits sufficient strength while allowing for the greatest degree of reduction both in its weight and production costs.

2. Description of the Related Art

A Japanese Utility Model Application Laid-Open No. HEI 2-143252 discloses a mechanism for mounting a seat belt of a center seating space of a three-passenger seat of a vehicle that can be separated into two seat sections, each independently slidable back and forth by means of a seat sliding rail defined by a pair of lower rails fixed to floor and a pair of upper rails fixed to the bottom of a seat. In the above-described seat belt mount mechanism, a seat belt of the center seating space of the seat is mounted to the inner upper rail of the respective seats.

The aforementioned seat belt mount mechanism requires sufficient distance between the right and left anchors of the seat belt of the center seating space of the seat, and the inner upper rail of the seat has to be arranged away from the center thereof. Therefore, the upper rails have to be positioned under the seats upon which the passengers of the right and left seating spaces are seated, resulting in deteriorated seating comfort. Furthermore, the resultant cantilever-like seat structure is likely to be affected by the moment exerted from the center seating space of the seat, so the structures of the seat and the upper rails are required to have sufficient strength.

Another type of seat belt mount mechanism, in which the anchors of the seat belt of the center seating space are mounted to the reinforcement provided between a pair of the upper rails via brackets has been proposed in order to arrange those anchors of the seat belt of the center seating space of the seat away from the center. This seat belt mount mechanism, however, may require an extra element for reinforcement. Moreover, the upper rails and reinforcement are required to exhibit enough strength to bear the bending moment generated by exertion of a high tensile load to the seat belt. The resultant seat belt mount mechanism may thus have heavy weight, leading to increased production costs.

SUMMARY OF THE INVENTION

In consideration of the foregoing disadvantages of the aforementioned conventional art, it is an object of the present invention to provide a mechanism for mounting a seat belt of a center seating space of a vehicle seat, which improves the seating comfort for passengers sitting in the right and left seating spaces of the seat by keeping sufficient distance between the right and left anchors of the seat belt of the center seating space of the seat, ensures enough strength to bear the tensile load exerted to the seat belt of the center seating space of the seat, and reduces weight and production costs to the greatest degree without using extra elements such as reinforcement or reinforcing the respective members.

The aforementioned object is achieved by providing a mechanism for mounting a seat belt of a center seating space of a vehicle seat including a seat sliding rail formed of a pair of lower rails fixed to a vehicle floor side and a pair of upper rails fixed to the bottom of a seat such that the right seating section and the left seating section of a three-passenger seat separated into two sections are independently slidable back and forth and a base member that is bent at a bent portion to define a belt mount plate portion, an end of which is provided with an anchor of a seat belt of a center seating space of a vehicle seat, and a rail connector plate portion connected to a side surface of the upper rail. The rail connector plate portion is connected to the side surface of an inner upper rail and the belt mount plate portion extends outward.

In the present invention, the base member is allowed to unbend at the bent portion straightening the belt mount plate portion in a direction where a seat belt is tensioned in response to exertion of a tensile load equal to or greater than a predetermined value to the seat belt of a center seating space of a seat.

As a result, the seating comfort of passengers sitting in the right and left seating spaces can be improved by ensuring sufficient distance between the right and left anchors of the seat belt of the center seating space. The resultant seat belt mount mechanism makes it possible to exhibit enough strength to bear the tensile load of the seat belt as well as reduce the weight and production costs to the greatest degree without using extra reinforcements or reinforcing the respective members.

BRIEF DESCRIPTION OF THE DRAWINGS

This and other objects will become more apparent when a preferred embodiment of this invention is considered in connection with the drawings, in which.

DETAILED DESCRIPTION OF THE PREFERRED EMBODIMENTS

Figure 3:
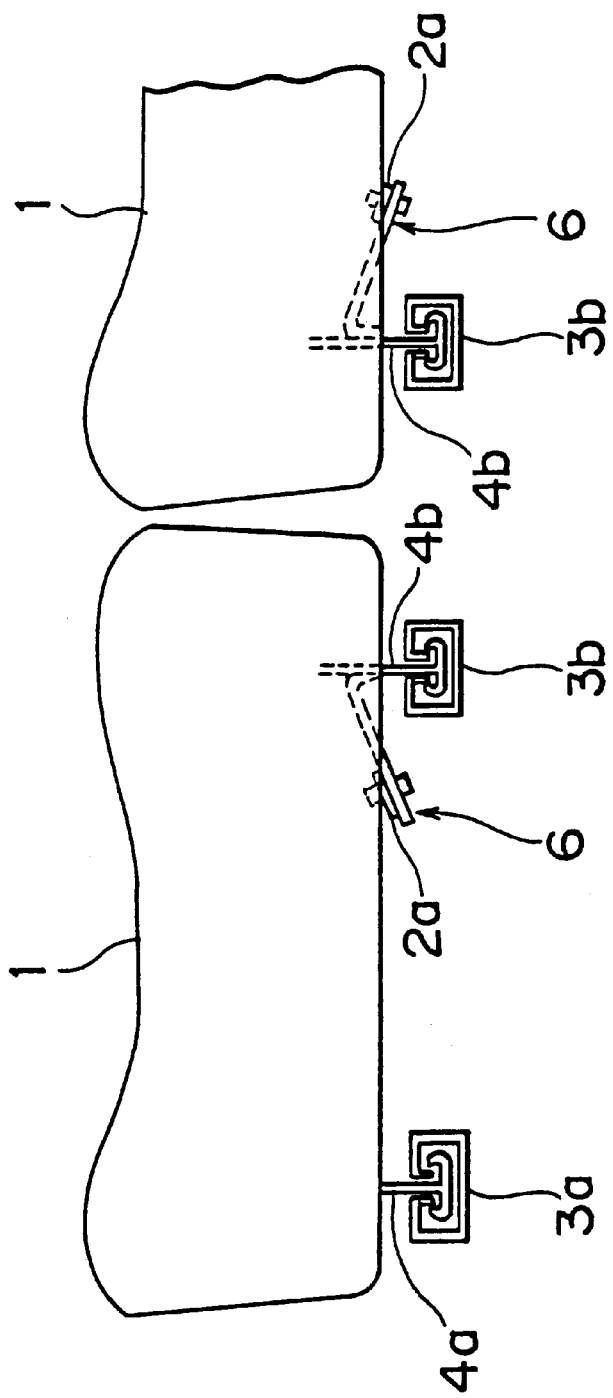
FIG. 3 is a front view of a rear seat of a vehicle.
Figure 4:
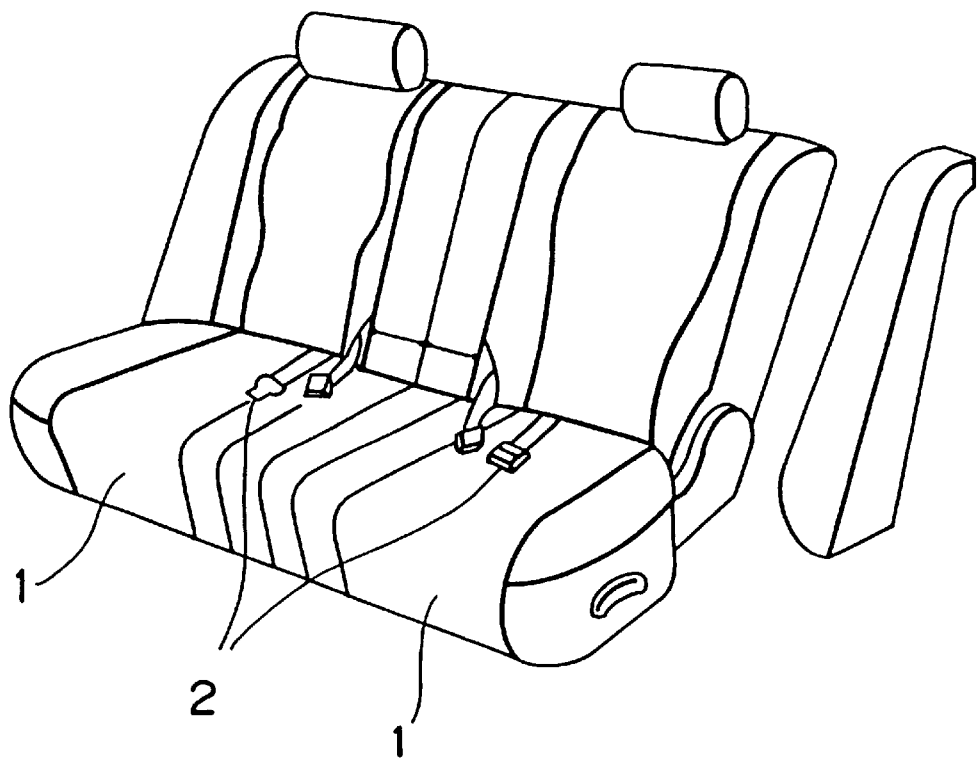
FIG. 4 is a schematic perspective view of the rear seat of the vehicle.

A preferred embodiment of the present invention will be described referring to the drawings which illustrate the mechanism for mounting a seat belt of a center seating space of a rear three-passenger seat of a vehicle. Referring to FIGS. 3 and 4, the rear seat is separated into right and left seats 1,1 at the center thereof. The respective seats 1,1 are independently slidable back and forth by means of their respective outer upper rails 4a,4a and inner upper rails 4b,4b attached to the bottom of the seats and supported by their corresponding outer lower rails 3a,3a and inner lower rails 3b,3b attached to the floor of the vehicle. The aforementioned characteristic is substantially the same as that of the conventional art described previously.

Figure 1:
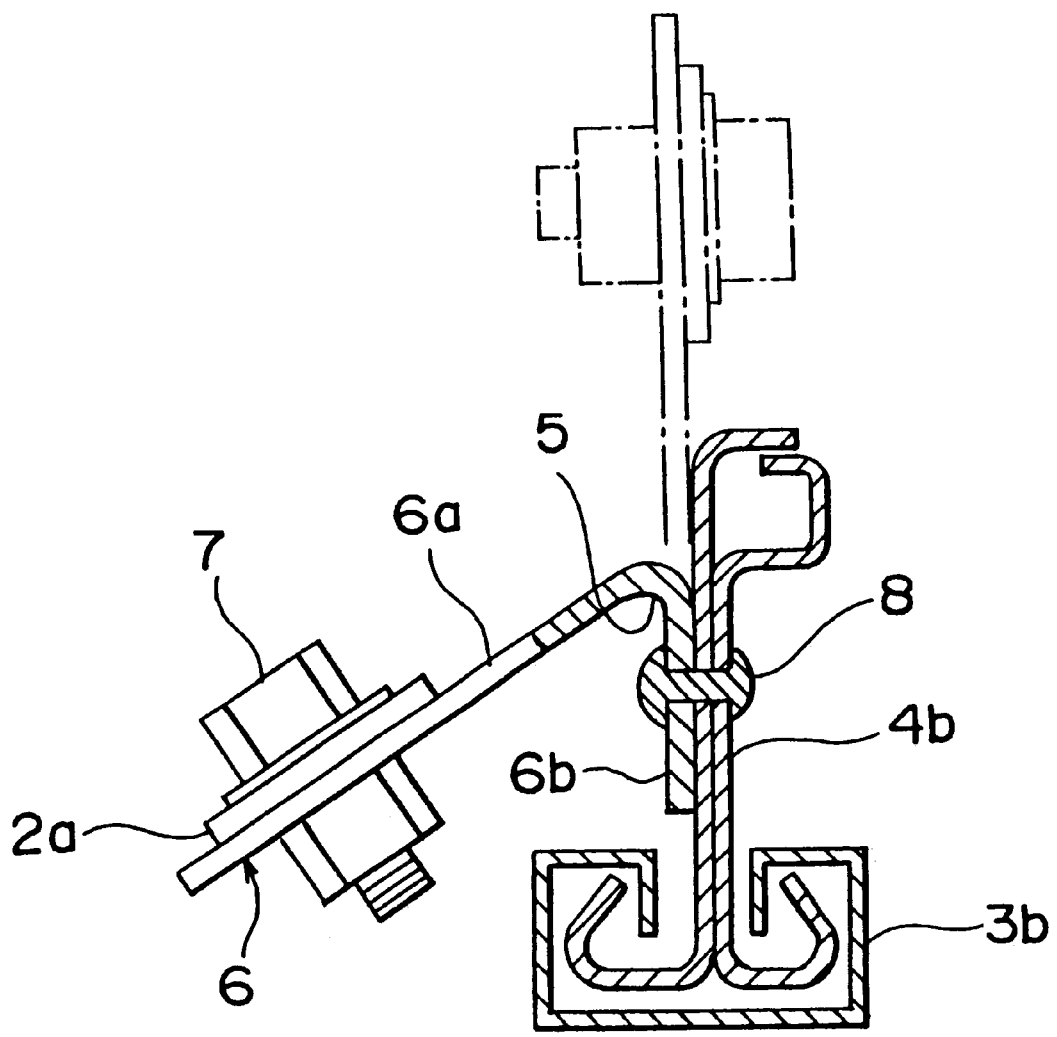
FIG. 1 is a sectional view of an embodiment of the present invention.
Figure 2:
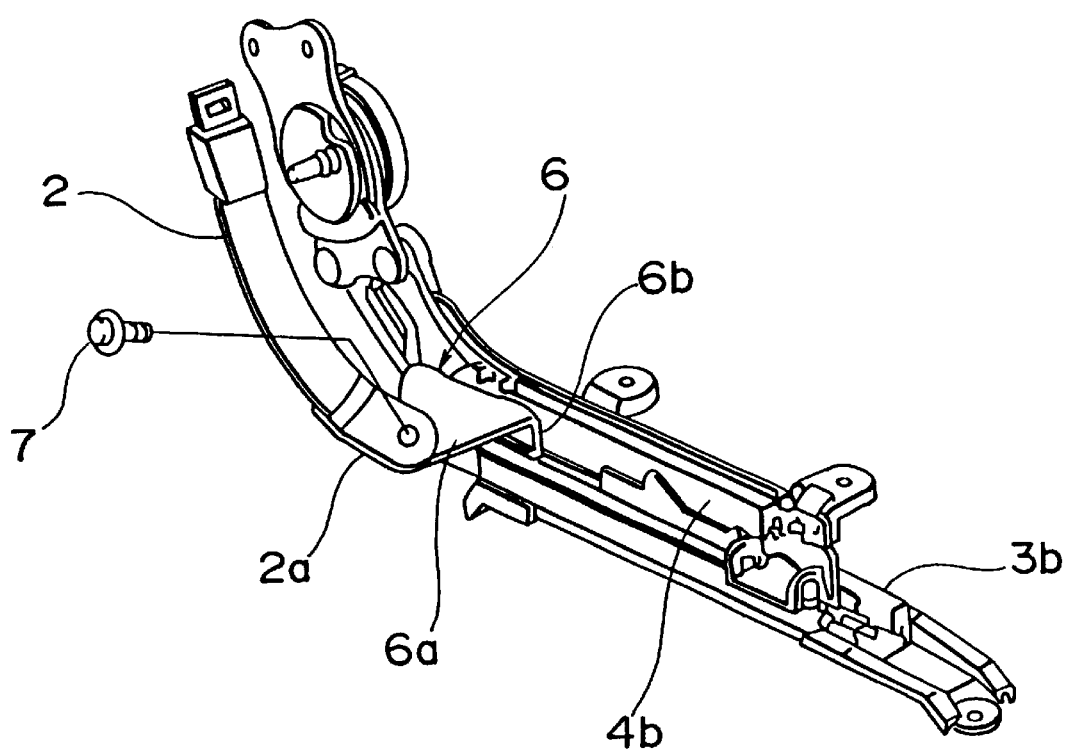
FIG. 2 is a perspective view of the embodiment of the present invention.

Referring to FIGS. 1 and 2, in the present invention, a base member 6 is defined by a belt mount plate portion 6a and a rail connector plate portion 6b with a bent portion 5 interposed therebetween such that the base member 6 has a substantially L-like cross-section. The rail connector plate portion 6b is attached to the outer surface of the inner upper rail 4b that is slidable back and forth along the lower rail 3b with a fastening member such as a rivet, a bolt and a nut, or by welding such that the belt mount plate portion 6a extends outward. An anchor 2a of the seat belt 2 of the center seating space of the rear seat is attached to a top portion of the belt mount plate portion 6a with a fastening member such as the bolt and nut. In a normal state, the base member 6 is bent in an L-like shape. However, it is designed to be formed of a material or have the thickness so that it can unbend at the bent portion 5 into a straight plate defined by the base mount plate portion 6a and the rail connector plate portion 6b in response to exertion of a tensile load equal to or greater than a predetermined value to the seat belt 2 of the center seating space of the seat. That is, in the process of designing the base member 6, the material for forming the portion in the vicinity of the bent portion or the thickness thereof may be changed to allow for unbending at the bent portion upon exertion of the tensile load equal to or greater than a predetermined value to the seat belt 2 of the center seating space of the rear seat.

In the present invention, the right and left separated seats 1,1 are slidable back and forth along their respective outer lower rails 3a,3a and inner lower rails 3b,3b attached to the lower portions of the seats 1,1. The aforementioned characteristic is substantially the same as that of the conventional art. As shown in FIG. 3, the anchor 2a of the seat belt 2 of the center seating space of the seat is attached to the top end of the belt mount plate portion 6a of the base member 6 that has been bent into an L-like shape instead of being attached directly to the inner upper rail 4b. Accordingly, the anchor 2a can be located away from the center of the seat by a length corresponding to that of the belt mount plate portion 6a extending in a lateral direction. Therefore, the required distance between the right and left anchors of the seat belt 2 of the center seating space can be ensured. As a result, passengers can be seated on the right and left seats having no upper rails therebelow, thus keeping them from feeling discomfort owing to the upper rails under their sitting positions.

In the present embodiment, the base member 6 is designed to unbend at the bent portion 5 to form a straight plate defined by the belt mount plate portion 6a and the rail connector plate portion 6b when the tensile load equal to or greater than a predetermined value is exerted to the seat belt 2. That is, when a high tensile load (assuming that approximately 1 ton of load is exerted to a seat belt in a strength test) is exerted to the seat belt 2, the belt mount plate portion 6a is straightened, as shown by the dotted line in FIG. 3, so as to form a substantially straight plate defined by the belt mount plate portion 6a and the rail connector plate portion 6b with the bent portion 5 interposed therebetween. As a result, the base member 6 is allowed to bear the tensile load of the seat belt only linearly. At this time, if the belt mount plate portion 6a remains bent in an L-shape, the bending moment will be exerted to the bent portion 5, thus requiring the inner upper rails 4b and connector pins 8 to have high strength. In the present invention, however, the base member 6 will straighten to form a straight plate, exhibiting sufficient durability against the tensile strength. Therefore, the inner upper rails 4b and connector pins 8 may be light and compact.

In this embodiment, the rear three-passenger seat is separated into a right seating section and a left seating section from the center thereof. Alternatively, the rear five-passenger seat may also be separated into two seating sections.

What is claimed is:

1. A mechanism for mounting a seat belt that is disposed at a center seating space of a vehicle seat of a vehicle, the vehicle including a vehicle floor, the vehicle seat including a bottom, a right seating section and a left seating section, the seat belt including an anchor, the mechanism comprising:

a seat sliding arrangement for each of the right seating section and the left seating section formed of a pair of lower rails fixed to the vehicle floor and inner and outer upper rails fixed to the bottom of each of the right seating section and the left seating section such that the right seating section and the left seating section separate the vehicle seat into two sections that are independently slidable back and forth, at least one of the inner upper rails the inner upper rail including an upright portion formed as a continuous one-piece extending in a substantially vertical direction of the vehicle;

a base member that is bent at a bent portion to define a belt mount plate portion and a rail connector plate portion, an end of the belt mount plate portion being provided with the anchor of the seat belt that is disposed at the center seating space of the vehicle seat, wherein the base member is allowed to unbend at the bent portion in response to exertion of a tensile load to the seat belt that is disposed at the center seating space of the vehicle seat; and the rail connector plate portion is directly attached to a side surface of the upright portion of the at least one of the inner upper rails, and the belt mount plate portion extends outward from the rail connector plate portion.

2. The mechanism for mounting a seat belt of a center setting space of a vehicle seat according to claim 1, wherein the base member unbends at the bent portion to straighten the belt mount plate portion in the direction that the seat belt is tensioned in response to exertion of the tensile load equal to or greater than a predetermined value to the seat belt that is disposed at the center seating space of the vehicle seat.

3. The mechanism for mounting a seat belt of a center seating space of a vehicle seat according to claim 2, wherein the base member unbends at the bent portion to form a substantially straight plate defined by the belt mount plate portion and the rail connector plate portion.

4. The mechanism for mounting a seat belt of a center seating space of a vehicle seat according to claim 1, wherein the belt mount plate portion of the base member extends obliquely such that the end of the belt mount plate portion provided with the anchor of the seat belt is located at a lower level than the bent portion as viewed in the vertical direction of the vehicle.

5. The mechanism for mounting a seat belt of a center seating space of a vehicle seat according to claim 1, wherein a pair of said base members are attached to a pair of said inner upper rails, respectively, and wherein the base mount plate portion of one of the base members extends outward in a direction opposite to that in which the base mount plate portion of the other of the base members extends.

* * * * *